United States Patent
Van Den Berghe et al.

(10) Patent No.: US 7,168,054 B2
(45) Date of Patent: Jan. 23, 2007

(54) SOFTWARE TRAFFIC GENERATOR/ANALYZER

(75) Inventors: Steve Roman Michel Van Den Berghe, Ghent (BE); Karel Magdaleen Omer Vereecke, Evergem (BE)

(73) Assignee: Alcatel, Paris (FR)

( * ) Notice: Subject to any disclaimer, the term of this patent is extended or adjusted under 35 U.S.C. 154(b) by 154 days.

(21) Appl. No.: 10/728,982

(22) Filed: Dec. 8, 2003

(65) Prior Publication Data

US 2004/0123255 A1    Jun. 24, 2004

(30) Foreign Application Priority Data

Dec. 23, 2002    (EP) ............................... 02293228.9

(51) Int. Cl.
  *G06F 17/50*    (2006.01)
(52) U.S. Cl. .............................................. 716/4; 716/1
(58) Field of Classification Search .................... 716/4, 716/1
  See application file for complete search history.

(56) References Cited

U.S. PATENT DOCUMENTS

| | | | |
|---|---|---|---|
| 4,937,825 A * | 6/1990 | Ballard et al. ............... 714/712 |
| 5,051,997 A | 9/1991 | Sakashita et al. | |
| 5,377,196 A * | 12/1994 | Godlew et al. ............... 714/712 |
| 5,592,628 A * | 1/1997 | Ueno et al. ................... 709/200 |
| 5,668,947 A | 9/1997 | Batcher | |
| 5,703,788 A | 12/1997 | Shei et al. | |
| 5,784,558 A * | 7/1998 | Emerson et al. ............. 709/230 |
| 5,961,653 A | 10/1999 | Kalter et al. | |
| 6,072,994 A * | 6/2000 | Phillips et al. ................ 455/84 |
| 6,104,868 A * | 8/2000 | Peters et al. ................. 709/202 |
| 6,407,828 B1 * | 6/2002 | Medina ....................... 358/462 |
| 6,614,796 B1 * | 9/2003 | Black et al. ................. 370/403 |
| 6,950,405 B1 * | 9/2005 | Van Gerrevink ............ 370/252 |
| 2003/0229827 A1 * | 12/2003 | Dun et al. ..................... 714/48 |
| 2004/0128641 A1 * | 7/2004 | Broberg et al. .............. 716/18 |

FOREIGN PATENT DOCUMENTS

EP    0 953 988 A2    11/1999

OTHER PUBLICATIONS

Moussavi, "Performance of Link Level Protocols over Satellite", Apr. 1989, Mediterranean Electrotechnical Conference on Integrating Research, Industry and Education in Energy and Communication Engineering, Proceedings pp. 629-632.*

* cited by examiner

*Primary Examiner*—Sun James Lin
(74) *Attorney, Agent, or Firm*—Sughrue Mion, PLLC

(57) ABSTRACT

A computer program product that runs via a processor system for generating and/or analyzing traffic signals for testing at least parts of integrated-circuit-environments designed to handle traffic signals are provided with generic modules and specific module to increase the re-usability. The specific modules are designed for interfacing the computer program product with a protocol used in the integrated-circuit-environment, such as an Internet-Protocol or an Asynchronous-Transfer-Mode-Protocol or an Ethernet-Protocol traffic protocol, or a flexbus4 or a SPI4.2 bus protocol. The processor system already present in the integrated-circuit-environment and comprising a host processor is used for interfacing with the computer program product, which saves additional hardware, with generated traffic signals flowing from the host processor to a buffer and from the buffer to at least one further circuit of the integrated-circuit-environment.

14 Claims, 2 Drawing Sheets

SOFTWARE TRAFFIC GENERATOR/ANALYZER

BACKGROUND OF THE INVENTION

The invention relates to a computer program product to be run via a processor-system for generating and/or analyzing traffic signals for testing at least a part of at least one integrated-circuit-environment, which integrated-circuit-environment is designed to handle traffic signals.

Such an integrated-circuit-environment, for example, corresponds with an Application Specific Integrated Circuit or ASIC for use in a switch, router, bridge, (de)multiplexer, modem, etc., or corresponds with several circuits like, for example, ASICs on a Printed Circuit Board or corresponds with the Printed Circuit Board etc., whereby at least one circuit or at least one connection between at least two circuits is to be tested.

A prior art computer program product is known from U.S. Pat. No. 5,703,788, which discloses a library of test programs, an autodetector, an autoverifier, a failure report generator, a tools archiver, and a package information logger.

The known computer program product is disadvantageous, inter alia, due to the prior art computer program product being insufficiently re-usable and efficient.

SUMMARY OF THE INVENTION

It is an aspect of the invention, inter alia, of providing a computer program product that is better re-usable and more efficient.

The computer program product according to the invention comprises an integrated-circuit-environment that comprises a processor-system, with the computer program product comprising at least one generic module and at least one specific module, with at least one specific module being designed for interfacing the computer program product with a protocol used in the integrated-circuit-environment.

By providing the computer program product with the generic module that is re-usable in next generations of the computer program product due to being generic, the re-usability of the computer program product has been increased. By providing the computer program product with the specific module that interfaces with a protocol used in the integrated-circuit-environment, the computer program product can be adapted to the kind of integrated-circuit-environment to be tested. By using the processor-system already present in the integrated-circuit-environment, no additional hardware is required, and the efficiency is increased.

The part of the integrated-circuit-environment to be tested may correspond with at least a part of the processor-system or with at least a part of an other circuit forming part of the integrated-circuit-environment or with at least one connection between at least two circuits (including the processor-system or not).

Of course, when testing the same kind of integrated-circuit-environment, the same specific module can also be re-used. Of course, re-usability will generally increase the overall efficiency.

By using a processor-system comprising at least one host processor, generated traffic signals firstly flow from the host processor to a buffer and secondly flow from the buffer to at least one further circuit of the integrated-circuit-environment, and an efficient procedure for testing the integrated-circuit-environment by using its own host processor in combination with the computer program product according to the invention has been created, and the additional hardware-problem of how to get the generated traffic signals from the integrated-circuit-environment's own host processor into other parts of the integrated-circuit-environment has been solved.

The protocol used in the integrated-circuit-environment, for example, corresponds with a protocol used in the host processor or with a protocol used in one or more of the other circuits etc.

By letting generated traffic signals leave the computer program product via a software traffic sender, with traffic signals to be analyzed arriving at the computer program product via a software traffic receiver, the additional interface-problem of how to get the generated traffic signals from the computer program product into the hardware parts of the integrated-circuit-environment has been solved.

By designing the specific module for interfacing a traffic protocol, integrated-circuit-environments based upon different traffic protocols can be tested by using the same generic module in combination with different specific modules.

By designing the specific module for interfacing an Internet-Protocol or an Asynchronous-Transfer-Mode-Protocol or an Ethernet-Protocol, integrated-circuit-environments designed for an Internet environment or an Asynchronous-Transfer-Mode environment or an Ethernet environment can be tested. Of course, further environments are not to be excluded.

By designing the specific module for interfacing a bus protocol, integrated-circuit-environments based upon different bus protocols can be tested by using the same generic module in combination with different specific modules.

By designing the specific module for interfacing a flexbus4 protocol or a SPI4.2 protocol (System Physical Interface), integrated-circuit-environments having a flexbus4 or a SPI4.2 can be tested. Of course, further protocols are not to be excluded.

Preferably at least one generic module is designed to operate in dependence of adjustable parameters, for adjusting the test environment. In case of the adjustable parameters comprising a bandwidth parameter, the bandwidth of the traffic signals in the test can be adjusted. In case of the adjustable parameters comprising a flow parameter, the number of flows of the traffic signals in the test can be adjusted. Of course, further adjustable parameters are not to be excluded.

The invention further relates to a processor-system for running a computer product for generating and/or analyzing traffic signals for testing at least a part of at least one integrated-circuit-environment, which integrated-circuit-environment is designed to handle traffic signals.

The processor-system according to the invention comprises an integrated-circuit-environment that comprises a processor-system, with the computer program product comprising at least one generic module and at least one specific module, with at least one specific module being designed for interfacing the computer program product with a protocol used in the integrated-circuit-environment.

The invention yet further relates to an integrated-circuit-environment to be tested via a processor-system for running a computer program product for generating and/or analyzing traffic signals for testing at least a part of the integrated-circuit-environment, which integrated-circuit-environment is designed to handle traffic signals.

The integrated-circuit-environment according to the invention comprises a processor-system, with a computer program product comprising at least one generic module and at least one specific module, with at least one specific module being designed for interfacing the computer program product with a protocol used in the integrated-circuit-environment.

The invention also relates to a method for generating and/or analyzing traffic signals via a processor-system for testing at least a part of at least one integrated-circuit-environment designed to handle traffic signals.

The method according to the invention comprises an integrated-circuit-environment comprising a processor-system, with the method comprising at least one generic step and at least one specific step, with at least one specific step being performed for interfacing with a protocol used in the integrated-circuit-environment.

Embodiments of the processor-system according to the invention and of the integrated-circuit-environment according to the invention and of the method according to the invention correspond with the embodiments of the computer program product according to the invention.

The invention is based upon an insight, inter alia, that large parts of computer program products for generating and/or analyzing traffic signals for testing at least parts of integrated-circuit-environments should be re-usable, and is based upon a basic idea, inter alia, that this re-usability can be increased by creating generic modules and specific modules.

The invention solves the problem, inter alia, of providing a computer program product having a better re-usability, and is advantageous, inter alia, in that the use of the processor-system of the integrated-circuit-environment avoids the need for additional hardware, which increases the efficiency.

These and other aspects of the invention will be apparent from and elucidated with reference to the embodiments(s) described hereinafter.

DETAILED DESCRIPTION OF THE INVENTION

Figure 1:
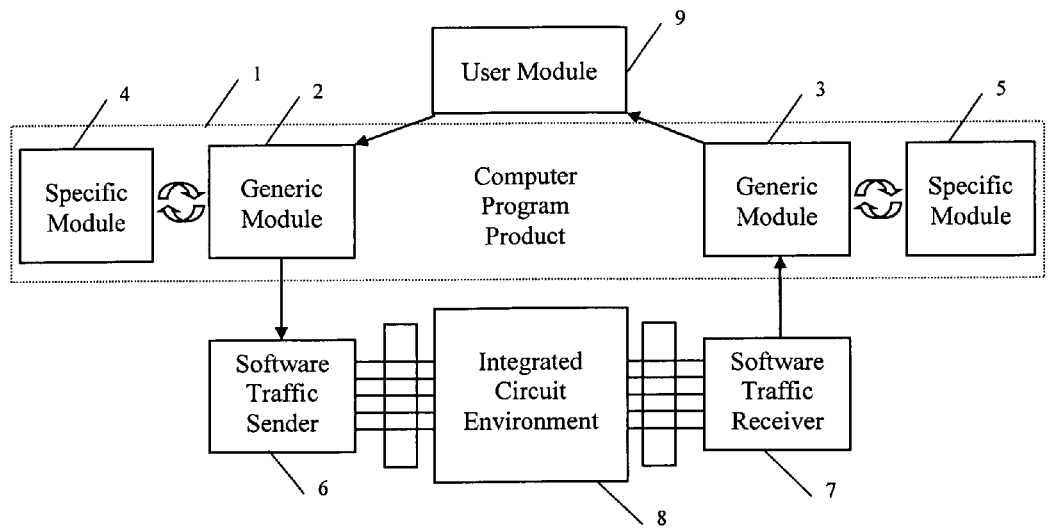
FIG. 1 illustrates, in block diagram form, an overview of the computer program product according to the invention.

The overview of the computer program product according to the invention shown in FIG. 1 comprises a computer program product 1, comprising a software traffic generator 2,4 and a software traffic analyzer 3,5. Software traffic generator 2,4 comprises a generic module 2 and a specific module 4, and software traffic analyzer 3,5 comprises a generic module 3 and a specific module 5. Generic module 2 receives information from a user module 9 and sends information to a software traffic sender 6. Generic module 3 receives information from a software traffic receiver 7 and sends information to user module 9. Between the traffic sender 6 and traffic receiver 7, an integrated-circuit-environment 8 is situated. Although just one specific module 4,5 is shown in the drawing, more than one may be present, for example coupled serially or in parallel to each other and/or to the corresponding generic module 2,3.

Figure 2:
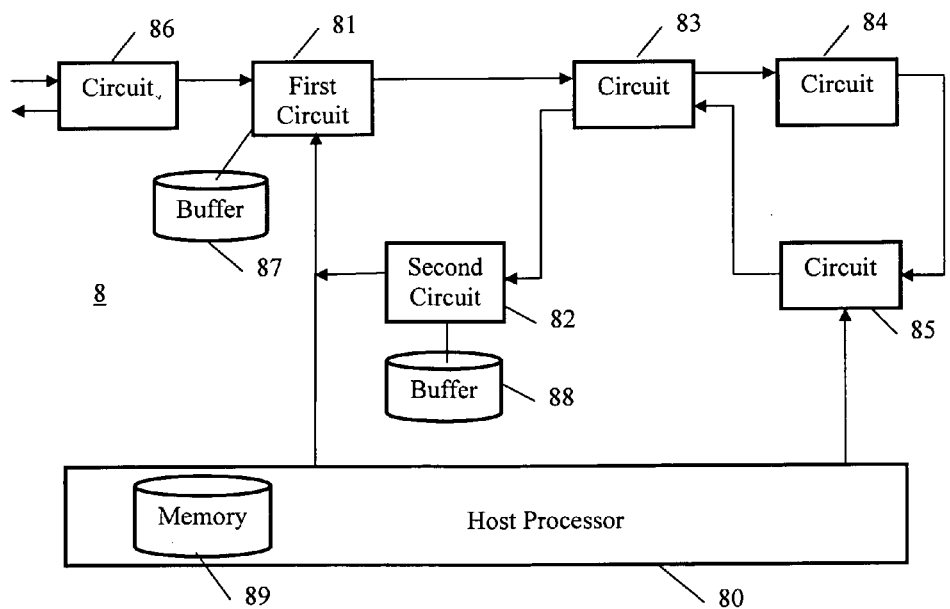
FIG. 2 illustrates, in block diagram form, an integrated-circuit-environment according to the invention.

The integrated-circuit-environment 8 according to the invention shown in FIG. 2 comprises a host processor 80 with a memory 89. An in/output of host processor 80 is coupled via a PCI bus to an in/output of a first circuit 81 communicating with a buffer 87 and to an in/output of a second circuit 82 communicating with a buffer 88. A further in/output of a first circuit 81 is coupled to an in/output of a further circuit 86 and a yet further in/output of first circuit 81 is coupled to an in/output of a further circuit 83 of which a further in/output is coupled to a further in/output of second circuit 82. Another input/output of further circuit 83 is coupled to an in/output of a further circuit 84 and a yet other in/output of further circuit 83 is coupled to an in/output of a further circuit 85, of which a further in/output is coupled to a further in/output of a further circuit 84. Further circuit 85 is further coupled to host processor 80.

The computer program product 1 runs via processor-system 80 (more particularly via host processor 80) for generating (via software traffic generator 2,4) and/or analyzing (via software traffic analyzer 3,5) traffic signals for testing integrated-circuit-environment 8 comprising the processor-system 80. Such an integrated-circuit-environment 8 for example corresponds with an Application Specific Integrated Circuit or ASIC for example for use in a switch, router, bridge, (de)multiplexer, modem, etc. or for example, corresponds with several circuits like ASICs on a Printed Circuit Board or corresponds with the Printed Circuit Board etc., whereby at least one circuit or at least one connection between at least two circuits is to be tested etc.

By providing the computer program product 1 with the generic module 2,3, which is re-usable in next generations of the computer program product 1 due to being generic, the re-usability of the computer program product 1 has been increased. By providing the computer program product 1 with the specific module 4,5, which interfaces with a protocol used in the integrated-circuit-environment 8, the computer program product 1 can be adapted to the kind of integrated-circuit-environment 8 to be tested. By using the processor-system 80 already present in the integrated-circuit-environment 8, no additional hardware is required. The protocol used in the integrated-circuit-environment 8, for example, corresponds with a protocol used in the host processor 80 or with a protocol used in one or more of the further circuits 83,84,85 or with a protocol used in the first or second circuit 81,82 etc.

The part of the integrated-circuit-environment 8 to be tested may correspond with at least a part of the processor-system 80 or with at least a part of an other circuit 81–88 forming part of the integrated-circuit-environment 8 or with at least one connection between at least two circuits 80–88 (including the processor-system 80 or not).

The specific modules 4,5 interface traffic protocols like Internet-Protocols or Asynchronous-Transfer-Mode-Protocols or Ethernet-Protocols and/or interface bus protocols like flexbus4 protocols or SPI4.2 (System Physical Interface) protocols. However, other protocols are not to be excluded.

The generic modules 2,3 operate in dependence of adjustable parameters for adjusting the test environment. These adjustable parameters comprise a bandwidth parameter for adjusting the bandwidth of the traffic signals in the test and/or comprise a flow parameter for adjusting the number of flows of the traffic signals in the test. Other adjustable parameters are not to be excluded.

The traffic sender 6 forms a tool for interfacing the computer program product 1 according to the invention (more particularly modules 2,4) with the hardware. Similarly, the traffic receiver 7 forms a tool for interfacing the computer program product 1 according to the invention (more particularly modules 3,5) with the hardware.

Generated traffic signals firstly flow from the host processor 80 via the first circuit 81 to the buffer 87 and are stored in buffer 87. Secondly, they flow from the buffer 87 to at least one further circuit 83,84,85 of the integrated-circuit-environment 8, and an efficient procedure for testing the integrated-circuit-environment 8 by using its own host processor 80 in combination with the computer program product 1 according to the invention has been created, and the additional hardware-problem of how to get the generated traffic signals from the integrated-circuit-environment's 8 own host processor 80 into other parts of the integrated-circuit-environment 8 has been solved.

Via further circuits 83, 84 and 85 the traffic signals return via second circuit 82 in buffer 88 where they are stored. Then they are supplied to host processor 80 for being analyzed, etc.

The generated traffic signals leave the computer program product 1 via a software traffic sender 6, with traffic signals to be analyzed arriving at the computer program product 1 via a software traffic receiver 7, to solve the additional interface-problem of how to get the generated traffic signals from the computer program product 1 into the hardware parts of the integrated-circuit-environment 8 and vice versa.

Figure 3:
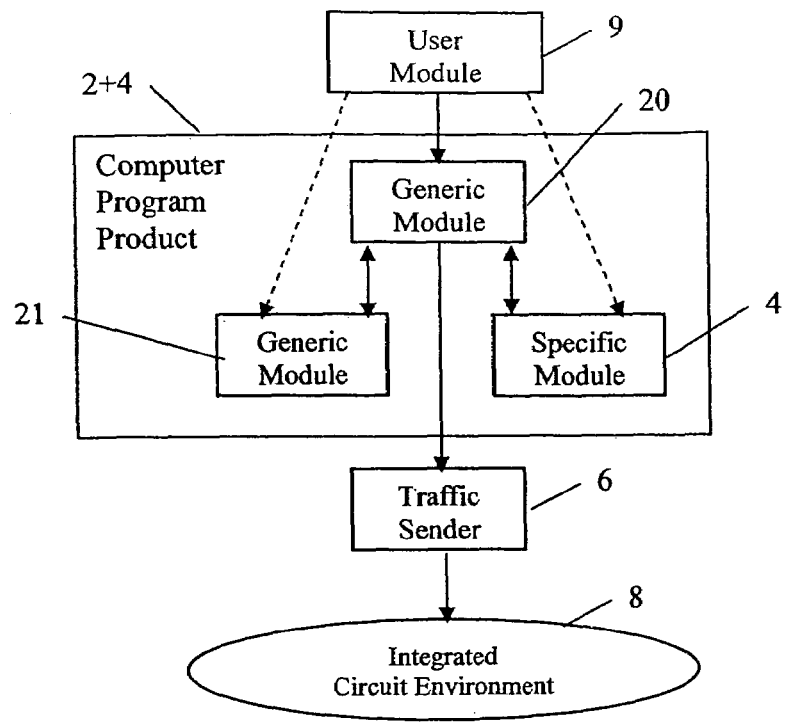
FIG. 3 illustrates, in block diagram form, a more detailed view of the computer program product according to the invention for generating traffic signals.

The more detailed view of the computer program product 1 according to the invention for generating traffic signals as shown in FIG. 3 comprises a computer program product 2+4 comprising specific module 4 and generic modules 20 and 21, with generic module 20 receiving information from user module 9 and sending information to generic module 21 and to specific module 4 and to traffic sender 6, which sends traffic signals to integrated-circuit-environment 8. Generic module 21 and specific module 4 also receive information from user module 9 and send back information to generic module 20.

Generic module 20 for example builds packet data units and transmits the built packet data units, generic module 21 for example constructs a payload (like for example all zero, all one, increasing bytes, decreasing bytes etc.) and specific module 4 for example constructs headers (like for example in accordance with Internet Protocol version 4 or 6 etc.).

The following functions can, for example, be found in the generating part of the computer program product:

non-functional interface functions (like for example an initialization function, a setting function for setting the seed used for PRB generation (Pseudo Random Bit Pattern), a closing function etc.), packet data unit definition interface functions (for example, a header definition function for getting a header size (in bytes) based on the header definition, a header construction function for constructing a packet data unit header (the necessary memory should have been allocated by the caller of this function, the header can depend on the payload (e.g., size field in Internet Protocol version 4 or 6), therefore it can be necessary to have the entire packet data unit definition to build the header), a payload construction function, a packet data unit construction function, a packet data unit destruction function etc.), traffic definition interface functions (for example, a creating function for creating traffic according to a per flow definition (the algorithm interleaves the packet data units of each flow, the interleaving will be better when the weights of the packet data units are smaller), a transmitting function for transmitting existing packet data units, a sending function for sending existing packet data units to the traffic sender, etc.).

Figure 4:
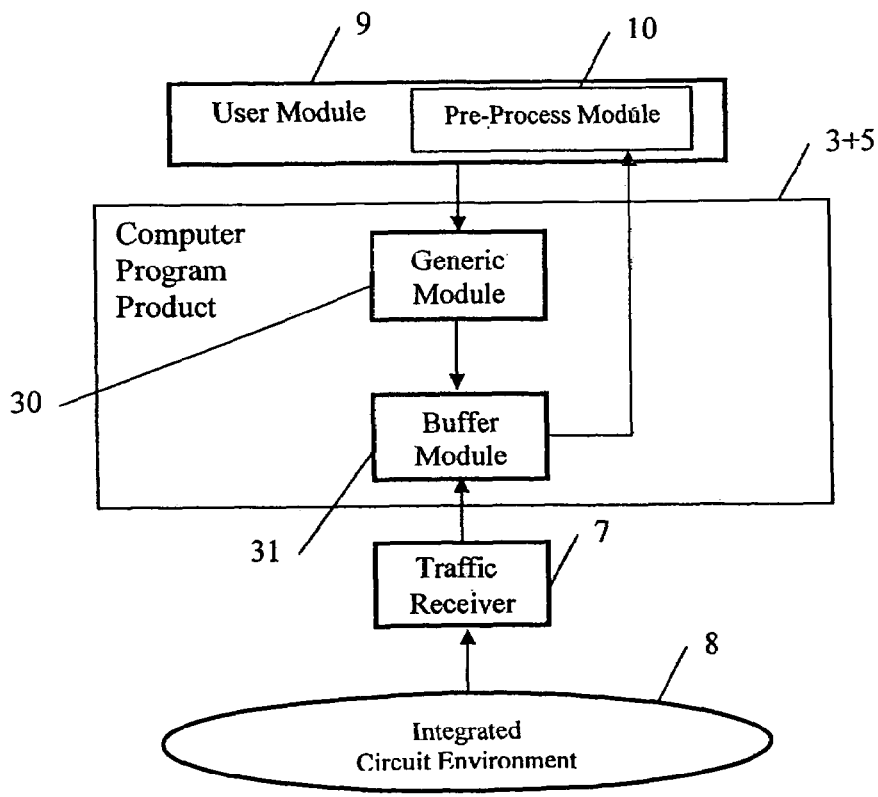
FIG. 4 illustrates, in block diagram form, a more detailed view of the computer program product according to the invention for analyzing traffic signals.

The more detailed view of the computer program product 1 according to the invention for analyzing traffic signals as shown in FIG. 4 comprises a computer program product 3+5 comprising a generic module 30 and a buffer module 31. Generic module 30 receives information from user module 9 and sends information to buffer module 31, which receives information from traffic receiver 7, which receives traffic signals to be analyzed from integrated-circuit-environment 8. Buffer module 31 further transmits information to a pre-process module 10, for example, forming part of user module 9.

The following functions can, for example, be found in the analyzing part of the computer program product:

non-functional interface functions (for example, an opening/starting function for opening/starting the receiving mechanism, a stopping function for stopping the receiving mechanism, a request function (the traffic receiver asks for a buffer to store a received packet data unit), a result function (the traffic receiver has written a packet data unit), an indication function for indicating whether the analyzing part is able to receive information, an overflow function for indicating whether a buffer is overflowed, etc.), functional interface functions (for example, a running function for running an analyze cascade over all buffered packet data units, a storing function (stubbing pre-process block: this function stores the packet data unit, it is to be used only in a pre-process cascade (not in an analyze cascade) and should terminate the pre-process cascade), a dropping function (stubbing pre-process block: this function drops the packet data unit, it is to be used only in a pre-process cascade (not in an analyze cascade) and should terminate the pre-process cascade), a stopping function (pre-process block—stops the packet data unit reception mechanism (not the cascade), this function is to be used only in a pre-process cascade (not in an analyze cascade)), processing functions (general processing block—counts the packet data units that pass, the user should set the counter to its initial value (zero), the counter saturates at its maximum value+general processing block—switches when counter reached x+general processing block—switches when packet data unit length is greater then x), a returning function (stubbing block, this function is doing nothing but returning, it can be used to terminate an unused branch in a block).

Generally, the computer program product operates from a host platform. This means that the traffic is generated and analyzed in software on a host processor. In this way, it is possible to make the core of the computer program product independent of the underlying hardware. To use this computer program product on a specific hardware configuration it is necessary to port it to the underlying hardware. This porting is done via the traffic sender and the traffic receiver (porting layer). The generating part and the analyzing part of the computer program product are in principle independent and they can run on the same or on separated processors at the same time. The parts are not multi-thread proof: only one instance of each part can run on a processor. This means that the analyzing part needs to be interrupt-based, as the analyzing part will have to accept packets while the generating part is still sending them (if they are running on the same processor). But, of course, the parts can be made multi-thread proof.

The expression "for" in for example "for generating" and "for analyzing" and "for testing" and "for interfacing" etc. does not exclude that other functions are performed as well, simultaneously or not. The expressions "X coupled to Y" and "a coupling between X and Y" and "coupling/couples X and Y" etc. do not exclude that an element Z is in between X and Y. The expressions "P comprises Q" and "P comprising Q" etc. do not exclude that an element R is comprises/included as well. The terms "a" and "an" do not exclude the possible presence of one or more pluralities. A processor-system generally comprises one or more processors.

The invention is based upon an insight, inter alia, that large parts of computer program products 1 for generating and/or analyzing traffic signals for testing at least parts of integrated-circuit-environments 8 should be re-usable, and is based upon a basic idea, inter alia, that this re-usability can be increased by creating generic modules 2,3 and specific modules 4,5.

The invention solves the problem, inter alia, of providing a computer program product 1 having a better re-usability, and is advantageous, inter alia, in that the use of the processor-system 80 of the integrated-circuit-environment 8 avoids the need for additional hardware, which increases the efficiency.

The invention claimed is:

1. A computer program product for generating and/or analyzing traffic signals for testing at least a portion of an integrated-circuit-environment adapted to handle said traffic signals, said computer program product comprising:
   at least one generic module; and
   at least one specific module, wherein said computer program product interfaces with a processor of said integrated-circuit-environment via said at least one generic module, and said at least one specific module provides a transmission protocol specific to said integrated-circuit-environment to said generic module.

2. The computer program product according to claim 1, wherein said integrated-circuit-environment comprises at least one host processor, with generated traffic signals flowing from said host processor to a buffer and from said buffer to at least one further circuit of said integrated-circuit-environment.

3. The computer program product according to claim 1, wherein generated traffic signals leave said computer program product via a software traffic sender, with traffic signals to be analyzed arriving at said computer program product via a software traffic receiver.

4. The computer program product according to claim 1, wherein said transmission protocol comprises a traffic protocol.

5. The computer program product according to claim 4, wherein said traffic protocol comprises an Internet-Protocol or an Asynchronous-Transfer-Mode-Protocol or an Ethernet-protocol.

6. The computer program product according to claim 1, wherein said transmission protocol comprises a bus protocol.

7. The computer program product according to claim 6, wherein said bus protocol comprises a flexbus4 protocol or a SPI4.2 protocol.

8. A computer running a computer program product for generating and/or analyzing traffic signals for testing at least a portion of an integrated-circuit-environment adapted to handle said traffic signals, said computer program product comprising:
   at least one generic module; and
   at least one specific module, wherein said computer executes said computer program product to interface with a processor of said integrated-circuit-environment via said at least one generic module, and said at least one specific module provides a transmission protocol specific to said integrated-circuit-environment to said generic module.

9. The computer according to claim 8, wherein traffic signals generated by said computer program product leave via a software traffic sender, and traffic signals to be analyzed by said computer program product arrive via a software traffic receiver.

10. The computer according to claim 8, wherein said transmission protocol comprises a traffic protocol.

11. The computer according to claim 10, wherein said traffic protocol comprises an Internet-Protocol or an Asynchronous-Transfer-Mode-Protocol or an Ethernet-protocol.

12. The computer according to claim 8, wherein said transmission protocol comprises a bus protocol.

13. The computer according to claim 12, wherein said bus protocol comprises a flexbus4 protocol or a SPI4.2 protocol.

14. A method for testing at least a portion of an integrated-circuit-environment adapted to handle traffic signals, the method comprising:
   generating traffic signals that are sent to said integrated-circuit-environment, wherein a first generic module of a computer program product is used to interface with an input of said integrated-circuit-environment, and a first specific module of the computer program product provides a transmission protocol used by said first generic module to interface with said integrated-circuit-environment; and
   analyzing traffic signals that are sent to said computer program product from said integrated-circuit-environment, wherein a second generic module of the computer program product is used to interface with the output of said integrated-circuit-environment, and a second specific module of the computer program product provides a transmission protocol used by said second generic module to interface with said integrated-circuit-environment.

* * * * *